US007685201B2

(12) United States Patent
Zeng et al.

(10) Patent No.: US 7,685,201 B2
(45) Date of Patent: Mar. 23, 2010

(54) PERSON DISAMBIGUATION USING NAME ENTITY EXTRACTION-BASED CLUSTERING

(75) Inventors: Hua-Jun Zeng, Beijing (CN); Shen Huang, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 11/796,818

(22) Filed: Apr. 30, 2007

(65) Prior Publication Data

US 2008/0065623 A1 Mar. 13, 2008

Related U.S. Application Data

(60) Provisional application No. 60/843,024, filed on Sep. 8, 2006.

(51) Int. Cl.
*G06F 7/00* (2006.01)
*G06F 17/30* (2006.01)

(52) U.S. Cl. .................. 707/748; 707/737; 707/749; 704/9

(58) Field of Classification Search .......... 707/3, 707/4, 5, 10, 101, 999.003, 999.004, 999.005, 707/999.01, 999.101; 704/9
See application file for complete search history.

(56) References Cited

U.S. PATENT DOCUMENTS

| 5,794,178 | A * | 8/1998 | Caid et al. ................. 704/9 |
| 5,842,194 | A * | 11/1998 | Arbuckle ................. 706/52 |
| 5,918,014 | A | 6/1999 | Robinson |
| 6,092,049 | A | 7/2000 | Chislenko et al. |
| 6,615,209 | B1 | 9/2003 | Gomes et al. |
| 6,920,448 | B2 | 7/2005 | Kincaid et al. |
| 6,975,766 | B2 | 12/2005 | Fukushima |
| 7,054,886 | B2 | 5/2006 | Stern et al. |
| 7,065,483 | B2 * | 6/2006 | Decary et al. ................. 704/7 |
| 7,089,241 | B1 | 8/2006 | Alspector et al. |
| 7,386,545 | B2 * | 6/2008 | Ashutosh et al. ............... 707/5 |
| 2002/0181466 | A1 * | 12/2002 | Neustein et al. ............. 370/393 |
| 2004/0111264 | A1 | 6/2004 | Wang et al. |
| 2005/0234879 | A1 * | 10/2005 | Zeng et al. ..................... 707/3 |
| 2006/0015484 | A1 | 1/2006 | Weng et al. |

(Continued)

OTHER PUBLICATIONS

Wan et al.,"Person resolution in person search results: WebHawk", Date: Nov. 2005, pp. 163-170, http://delivery.acm.org/10.1145/1100000/1099585/p163-wan.pdf?key1=1099585&key2=4498971421&coll=GUIDE&dl=Guide&CFID=33759982&CFTOKEN=31581655.*

(Continued)

*Primary Examiner*—John E Breene
*Assistant Examiner*—Phong Nguyen

(57) ABSTRACT

Described is a technology for disambiguating data corresponding to persons that are located from search results, so that different persons having the same name can be clearly distinguished. Name entity extraction locates words (terms) that are within a certain distance of persons' names in the search results. The terms are used in disambiguating search results that correspond to different persons having the same name, such as location information, organization information, career information, and/or partner information. In one example, each person is represented as a vector, and similarity among vectors is calculated based on weighting that corresponds to nearness of the terms to a person, and/or the types of terms. Based on the similarity data, the person vectors that represent the same person are then merged into one cluster, so that each cluster represents (to a high probability) only one distinct person.

17 Claims, 6 Drawing Sheets

U.S. PATENT DOCUMENTS

| | | | |
|---|---|---|---|
| 2006/0112110 A1* | 5/2006 | Maymir-Ducharme et al. | 707/100 |
| 2006/0167931 A1 | 7/2006 | Bobick et al. | |
| 2006/0224565 A1* | 10/2006 | Ashutosh et al. | 707/3 |
| 2007/0067285 A1* | 3/2007 | Blume et al. | 707/5 |
| 2007/0233656 A1* | 10/2007 | Bunescu et al. | 707/3 |
| 2008/0040352 A1* | 2/2008 | Ellis | 707/10 |
| 2008/0065621 A1* | 3/2008 | Ellis | 707/5 |

OTHER PUBLICATIONS

Agarwal et al., "Blocking objectionable web content by leveraging multiple information sources", Date: Jun. 2006, pp. 17-26, http://delivery.acm.org/10.1145/1150000/1147238/p17-agarwal.pdf?key1=1147238&key2=0119971421&coll=GUIDE&dl=GUIDE&CFID=33760353&CFTOKEN=12044676.*

Minkov, et al., "Contextual search and name disambiguation in email using graphs", Date: 2006, pp. 27-34, http://portal.acm.org/citation.cfm?id=1148170.1148179.

Niu, et al., "Weakly Supervised Learning for Cross-document Person Name Disambiguation Supported by Information Extraction", http://acl.ldc.upenn.edu/acl2004/main/pdf/372_pdf_2-col.pdf.

Phua, et al., "The Personal Name Problem and a Recommended Data Mining Solution", http://www.bsys.monash.edu.au/people/cphua/papers/The%20Personal%20Name%20Problem%20v0.8.pdf.

Thompson, et al., "Name Searching and Information Retrieval", http://acl.ldc.upenn.edu/W/W97/W97-0315.pdf.

* cited by examiner

PERSON DISAMBIGUATION USING NAME ENTITY EXTRACTION-BASED CLUSTERING

CROSS-REFERENCE TO RELATED APPLICATION

The present invention claims priority to U.S. provisional patent application Ser. No. 60/843,024 filed Sep. 8, 2006, which is hereby incorporated by reference.

BACKGROUND

When searching the web seeking to locate information related to a particular person, data about many persons having the same name are often retrieved by the search engine. To automatically disambiguate such persons, text clustering, which is directed towards finding groups within sets of data, can at times be a somewhat effective and practical technique. However, conventional text clustering mainly solves the problem of topic clustering, not person clustering or disambiguation.

In fact, traditional text clustering methods have many shortcomings when applied to person disambiguation, including that personal information is not well exploited, resulting in a number of challenges. For example, useful information relevant to a particular person is often very trivial, especially within the snippets retrieved by the search engine. While more ideal clues to distinctly identify a person might include concepts such as the person's organization, career, location, relationships with other persons, and so forth, such terms rarely occur more than one time in a short text segment. As a result, the text clustering results are often unexpectedly biased by other factors (which can be considered noise). Further, the cluster name is usually hard to understand with respect to the general goals of person disambiguation.

Moreover, some popular person names may be common among a relatively large number of different individuals. A normal iterative clustering algorithm, such as k-means, unavoidably increases analysis time. To enable an approach for online usage would require a fast, high-quality clustering algorithm.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards disambiguating data corresponding to persons that are located from search results, including extracting information about persons based on name entity extraction, and calculating similarity data. For example, the name entity extraction locates words (terms) that are within a certain distance of a person's name in the search results. The terms may provide relevant information that may be used in disambiguating search results that correspond to different persons having the same name, such as location information, organization information, career information, and/or partner information.

In one example implementation, each person is represented as a vector, and similarity among vectors is calculated based on weighting that corresponds to nearness of the terms to a person, and/or the types of terms. Based on the similarity between clusters, the person vectors that represent the same person are then merged into one cluster per person, so that each cluster represents (to a high probability) only one distinct person.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards disambiguating the identities of persons found in a web search, including generating a person cluster and cluster description, in which each cluster represents an individual person, and the cluster description represents that individual's personal information in a way that is readable for the searching user. In general and as described below, the technology described herein uses a name entity extraction approach for person disambiguation, based on personal information extracted from data (referred to herein as snippets) returned by a search engine.

As will be understood, the various aspects described herein thus benefit person searching, including by providing a better person disambiguation result, in which different persons are well distinguished from one another, and the data found that corresponds to the same person has a greater chance to be grouped together with other found data for that person, thereby avoiding redundant results.

In one example implementation, various features, criteria, weights and other factors are used in name entity extraction-based clustering, including using data that may be learned, such as from obtaining results based upon known data sets. However, as can be readily appreciated, the various data described herein are only examples, and the technology is not limited to any particular features criteria, weights, factors and so forth. Moreover, the general concept can be employed to yield useful products and services beyond person disambiguation.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in searching and computing in general.

Figure 1:
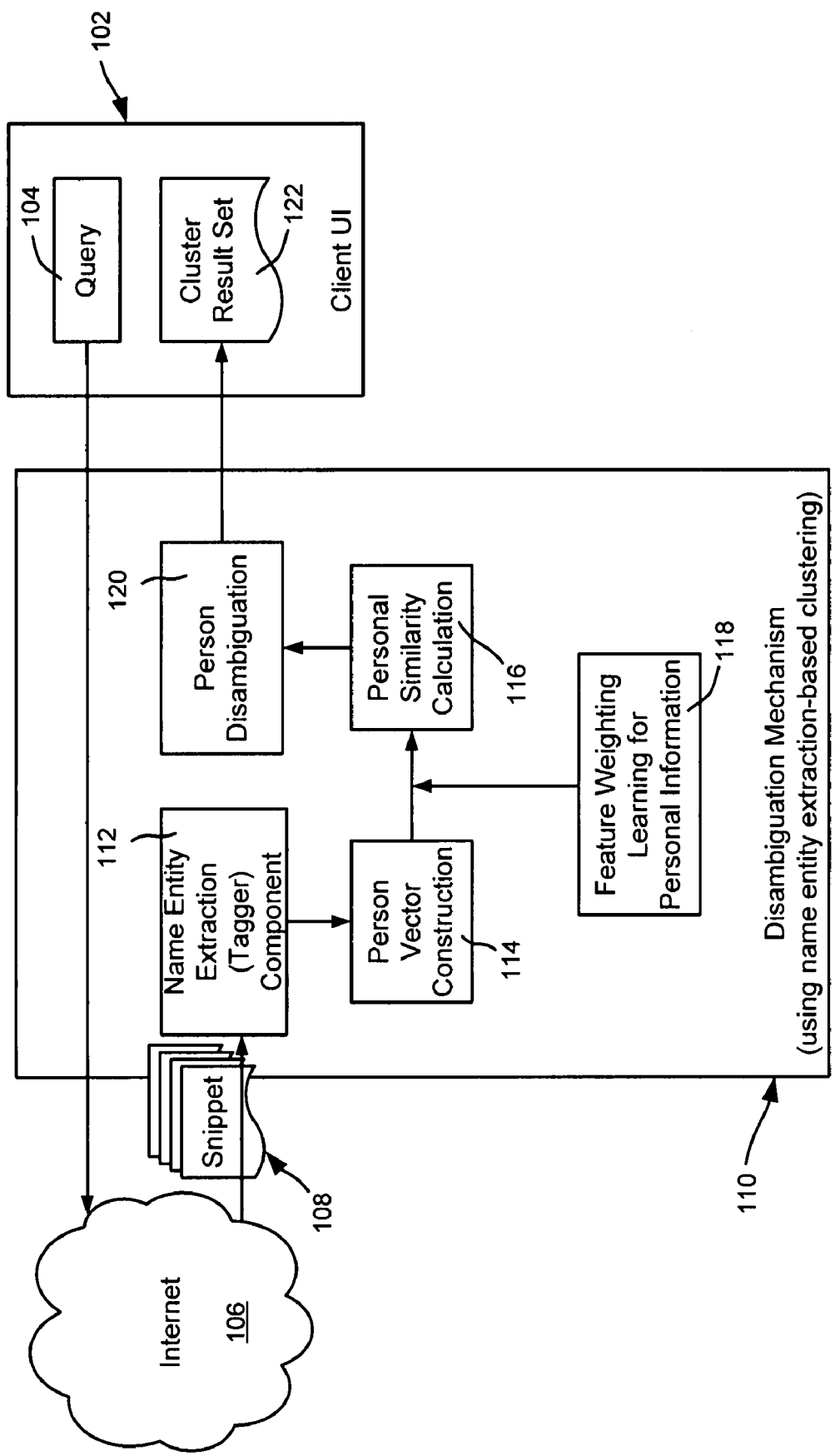
FIG. 1 shows an illustrative example block diagram of a person disambiguation mechanism that uses name entity extraction and clustering to distinguish persons' data located in a search.

FIG. 1 is a block diagram generally representing various aspects and concepts of person disambiguation using name entity extraction-based clustering. In general, a user or the like seeks a person, by operating via a client user interface 102 to submit a query 104 to the internet 106 (or possibly to a similar data source, such as an intranet or other personal data store). The query may be provided to one or more web search engines.

The query typically results in a number of snippets 108 containing information corresponding to the query. However, instead of returning the snippets 108 as results directly to the client, a disambiguation mechanism 110 processes the snippets 108. The disambiguation mechanism 110 may be (at least in part) located at an intermediate server, and/or may be incorporated into code at the client machine.

More particularly, within the disambiguation mechanism 110, a name entity extraction (tagger) component 112 extracts data from the returned snippets 108, such as data related to each resultant person's organization, location (e.g., city, state country and so forth) and co-occurred relationships with other persons. This data extraction is also represented in the flow diagram of FIG. 2 via step 202. Note that name entity extraction is somewhat familiar in natural language processing concepts; however, name entity extraction was heretofore not believed to be used in person disambiguation. Further, note that conventional name entity extraction typically does not capture career-related concepts, which may provide valuable factors in disambiguation; in contrast, the technology described herein is able to better disambiguate by considering a relationship between a person's name and an organization. With careers that are common to many individuals, the coverage may be improved by a bootstrapping process or the like.

Figure 2:
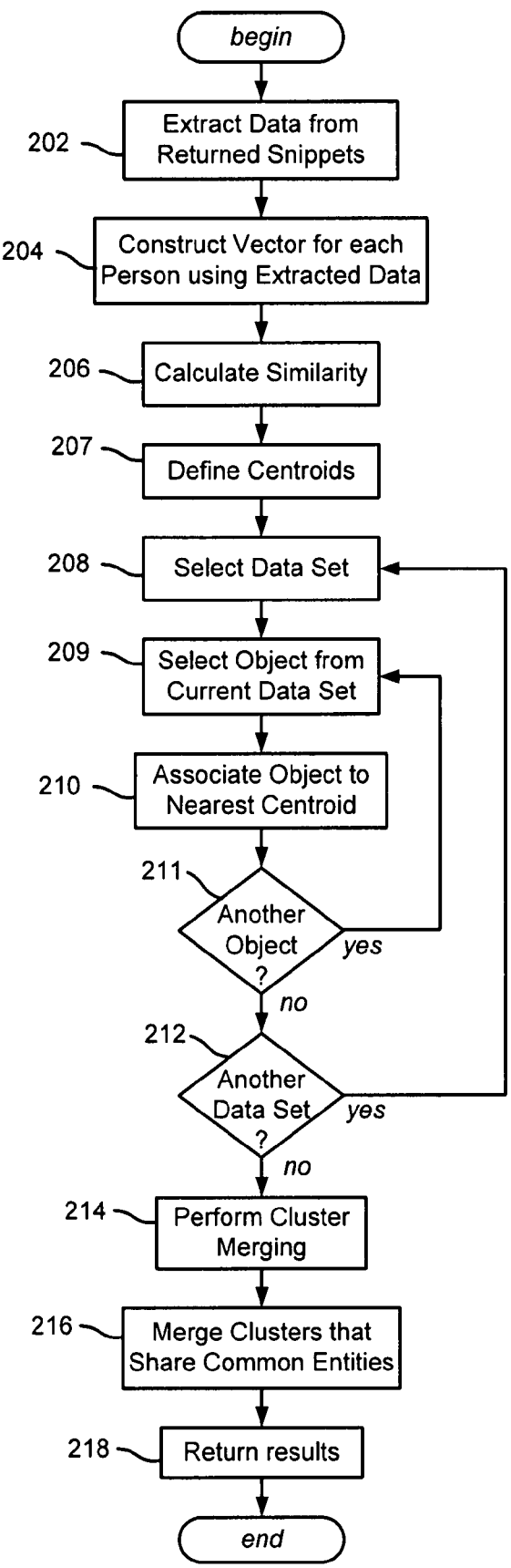
FIG. 2 is a flow diagram representing example steps taken by the person disambiguation mechanism exemplified in FIG. 1.

With the available personal information for each individual, a vector is constructed for each person, as represented in FIG. 1 by the person vector construction block 114 and in FIG. 2 via step 204. For example, a vector may be constructed using nearness measurements (e.g., on the surrounding words), with feature weights chosen using linear regression. In one example implementation, the vector representing one person is:

$f_{person}$=[location$_1$, . . . , location$_m$, organization$_1$, . . . , organization$_n$, career$_1$, . . . , career$_k$, partner$_1$, . . . , partner$_j$]

As also represented in FIG. 1 by the personal similarity calculation block 116, and in FIG. 2 at step 206, similarity is then calculated based on feature information. The feature information may be weighted, e.g., with the weight of each feature, such as organization, career, location, relationships to other persons and/or other features learned through linear regression or similar techniques. For example via a vector space model, (which is a well-known model in information retrieval and data mining), vector space modeling uses different features to characterize one object, whereby it is straight-forward to compute similarities between objects.

To assure accuracy, various issues are taken into account. For example, only the pieces of information (entities) near enough to the person's name (e.g., within a ten word distance in a snippet) may be considered as relevant; the similarity calculation can be adjusted by word distance. Further, different types of information, such as organization, career, location and so forth may have different weights in computing person similarity.

Considering nearness and similarity weighting, one example implementation calculates the similarity as follows:

$$PersonSim(f_{person1}, f_{person2}) = \frac{\sum_{i=1}^{|f|} nw \times ew \times f_i}{\sqrt{|f_{person1}|^2 + |f_{person2}|^2}}$$

where nw denotes "nearness weight", and ew denotes "entity weight." The concept of learning and/or applying weighing is represented in FIG. 1 by the feature weighting learning for personal information block labeled 118.

To learn the weights, some data may be manually labeled, and statistical method such as regression may be used, wherein regression is a classic statistical problem that tries to determine the relationship between two random variables x=(x1, x2, . . . , xp) and y. Linear regression attempts to explain the relationship of x and y with a straight line fit to the data.

Following vector building and similarity calculation, at block 120, persons are disambiguated by clustering person vectors. In one example implementation, a suitable person vector clustering algorithm that operates in one data scan is represented via steps 207-212 in FIG. 2. In general, there is adopted (e.g., onetime) k-means clustering and name entity extraction that achieves a relatively small, but high-quality, cluster, where K-means is an unsupervised learning algorithms that solves well-known clustering problems. The procedure follows a simple and easy way to classify a given data set through a certain fixed number of clusters (assume k clusters). These size and quality concepts factor into the purity of each cluster, e.g., where purity is directed towards having each cluster represent only one person. Such high-quality clusters are then used to help in discovering more important entities based on cluster information. When the clusters that share common entities are merged, this can ensure coverage, e.g., clusters that represent the same person can be grouped together.

More particularly, one example clustering algorithm that uses one-time k-means clustering and name entity extraction defines k centroids (step 207 of FIG. 2), one for each cluster. These centroids should be placed with careful consideration because a different location causes a different result; one useful choice is to place them as far as possible away from each other.

A next step is to take each object belonging to a given data set and associate it to the nearest centroid. Steps 208-212 represent such association for each object of each data set. When no object is pending, this part of the clustering operations is completed and an early grouping is done. Note that to ensure the purity of each cluster, that is, that each cluster represents only one person, the algorithm does not recalculate k new centroids of the clusters resulting from the previous step.

Cluster merging is then used, as represented at step 214, in which the high quality clusters help in discovering more important entities based on cluster information. An aspect referred to as "TFICF" is used to select key entities, where TF means term frequency and ICF means inverted cluster frequency. The ones that appear more in one cluster and less in others will be more significant for this cluster:

$$TFICF = tf(\text{term}) \cdot \log \frac{|\text{Clusters}|}{cf(\text{term})}$$

The clusters that share common entities are then merged, as represented by step 216. This step ensures that clusters representing the same person are grouped together, referred to as coverage. Once merged, a user can then browse the person search result set, e.g., using a clustering view. In the exemplified implementation, each cluster corresponds to a distinct person, and the cluster name provides the corresponding person's information, which is very intuitive in directly selecting the person's data that the user wanted to locate.

Turning to another aspect, the names of persons accessible via the web often correspond to different industries, such as entertainment, sports, science, business, and so forth. Classification of different persons into these industries can facilitate the browsing and search of specific persons. Name entities and keywords may be extracted from the surrounding context of a person name, and then a relational classification method may be used to classify the person name into one or more industries.

Aspects of industry classification include utilizing surrounding name entities in the classification, and a relational classification process that attempts to maximize the consistency of the industry of the person name and industries of the surrounding name entities. Based on the related name entities and related keywords, a relational classification method may be used to get an industry. In other words, this relational classification method not only attempts to maximize the probability of the keywords, but also attempts to maximize the consistency of the classification result among related name entities.

Most existing categorization algorithms assume that data objects are of the same type, with the objects having interrelationships serving as additional features. Focusing on any single aspects of these interrelationships and objects will not fully reveal their true categories. Relation classification is a categorization algorithm that classifies interrelated objects by iterative reinforcement between individual classification results of different types via the interrelationships.

Figure 3:
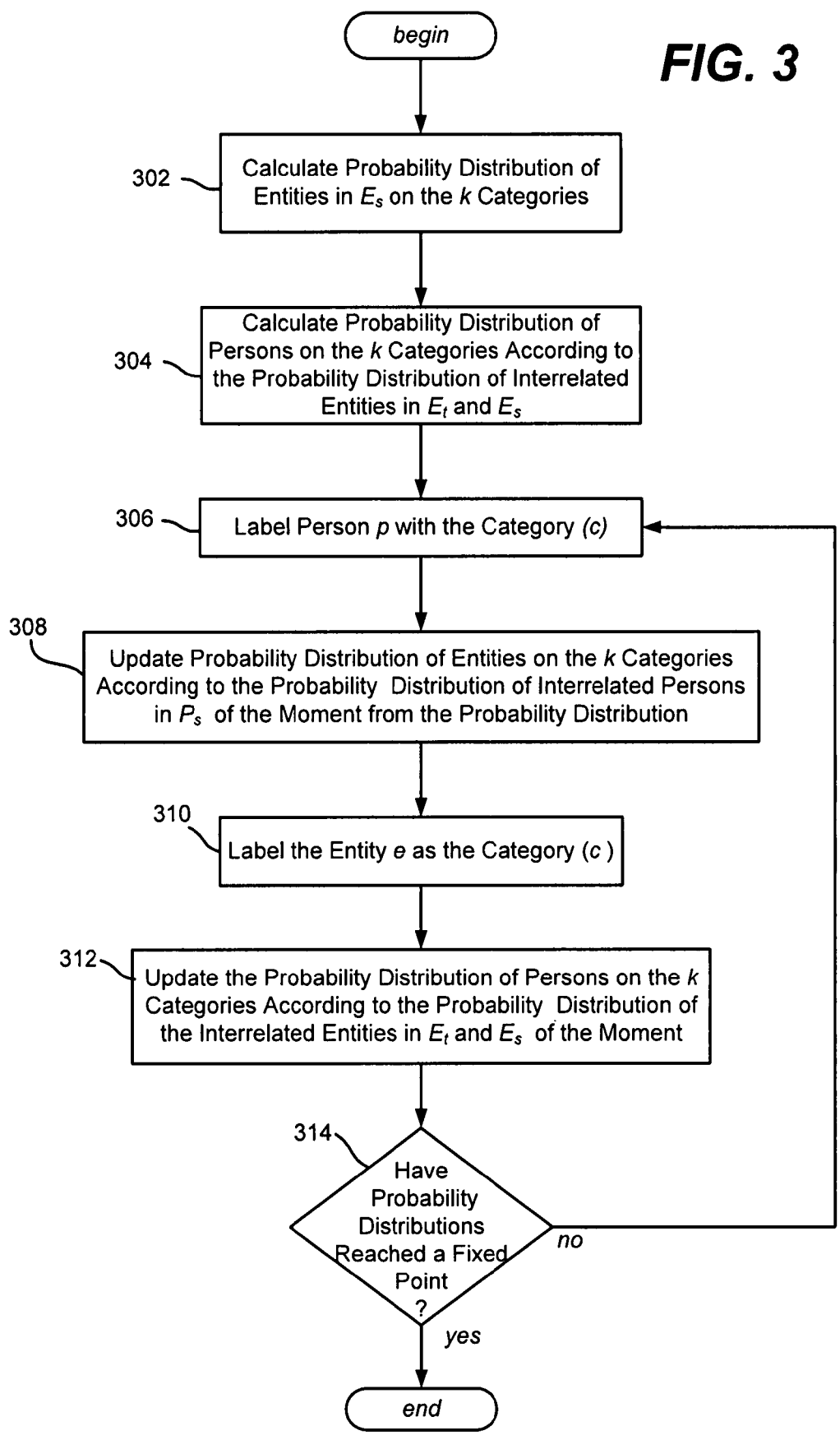
FIG. 3 is a flow diagram representing example steps taken by a relation classification mechanism to classify interrelated objects for determining a person's industry.

In one example implementation, the name entities E are divided into a training set $E_t$ and a testing set $E_s$. All persons are considered as being part of the test set $P_s$. One iterative reinforcement algorithm, referred to herein as the relational classification algorithm, takes $E_s$, $E_t$ and $P_s$ as inputs, and outputs the categories of $E_s$ and $P_s$. More particularly, as represented in FIG. 3, step 302 calculates the probability distribution of the entities in $E_s$ on the k categories, while step 304 calculates the probability distribution of persons on the k categories according to the probability distribution of the interrelated entities in $E_t$ and $E_s$. Step 306 then labels a current person, p, with the category c, where:

$$C = \underset{c_i}{\mathrm{argmax}}[P(c_i|p)];$$

Step 308 updates the probability distribution of entities on the k categories according to the probability distribution of the interrelated persons in $P_s$ of the moment from the probability distribution calculated at step 302. Step 310 then labels the entity e as the category c, where:

$$C = \underset{c_i}{\mathrm{argmax}}[P(c_i|e)];$$

Step 312 updates the probability distribution of persons on the k categories according to the probability distribution of the interrelated entities in $E_t$ and $E_s$ of the moment. Step 314 loops back to repeat steps 306, 308, 301 and 3126 until the probability distributions reach a fixed point.

Figure 4:
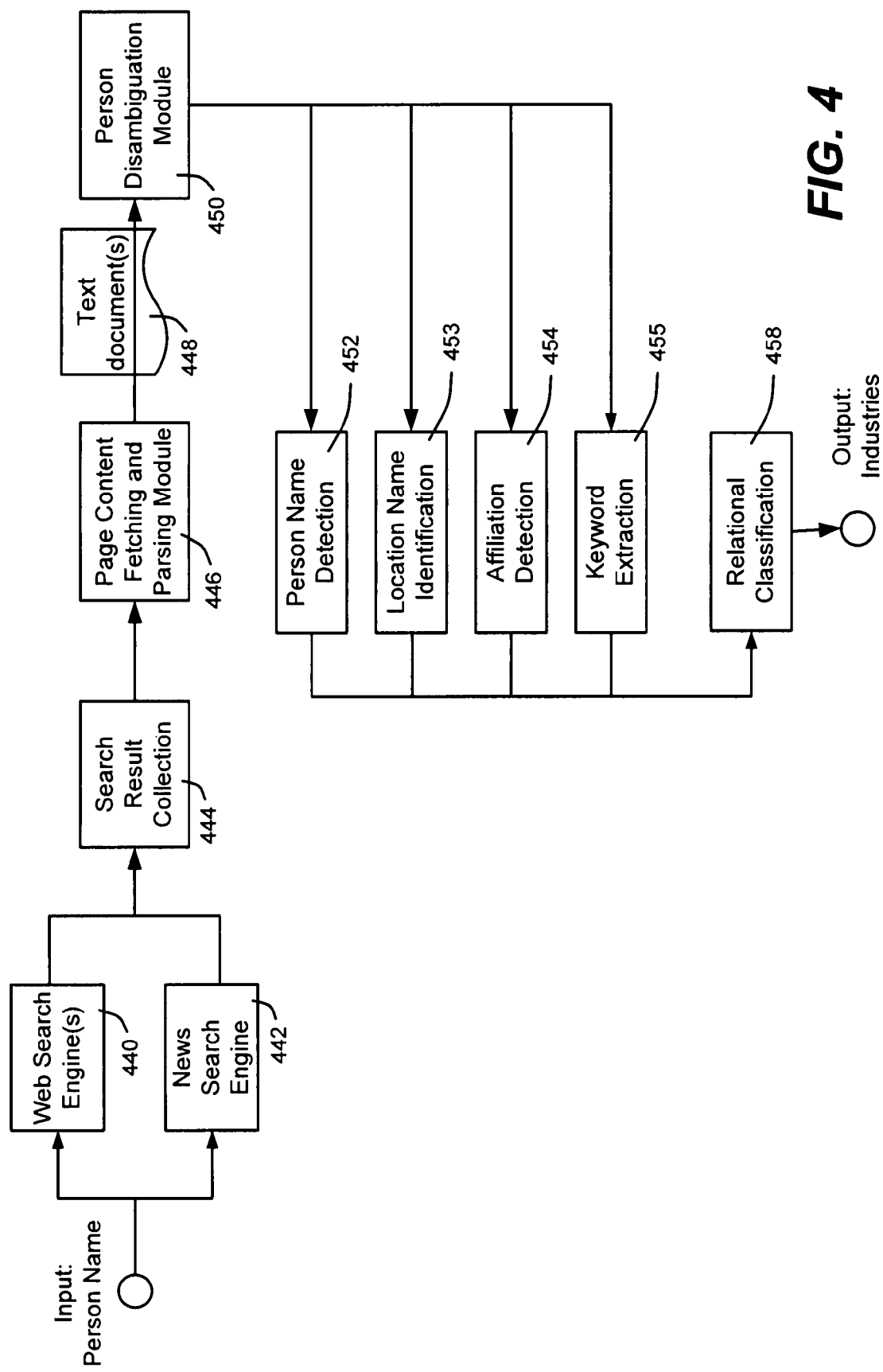
FIG. 4 a block diagram representing example mechanisms for determining a person's industry.
Figure 5:
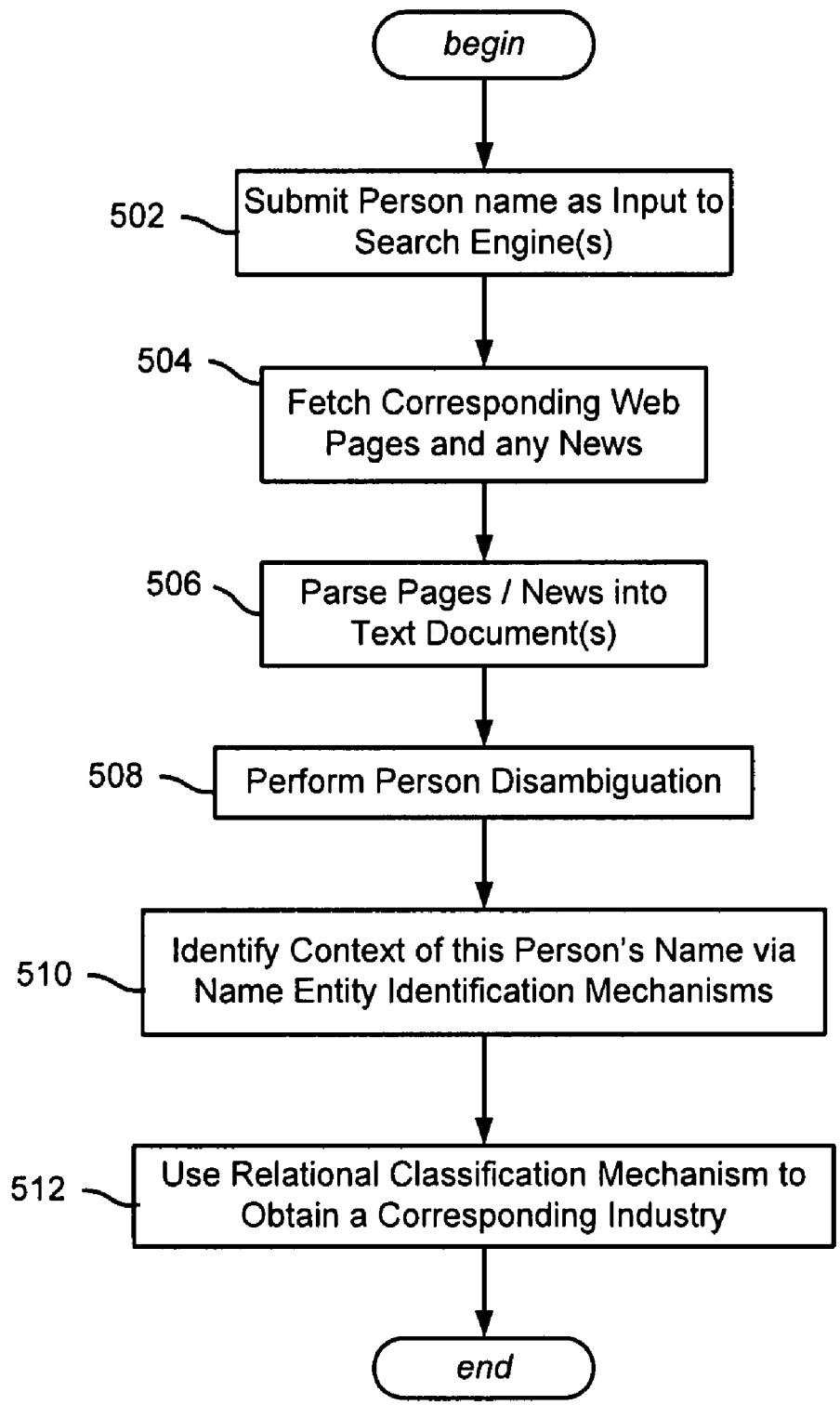
FIG. 5 is a flow diagram representing example steps that may be taken to determine a person's industry.

FIG. 4 is a block diagram of one example industry classification-related method, while FIG. 5 is a corresponding flow diagram. Given a person name as input, the person name is submitted into one or more web search engines 440 (FIG. 4) and (for example) one or more news search engines 442, as also represented in FIG. 5 via step 502. From each search engine is obtained the URL of each of the top results (e.g., on the order of 200 results for each engine), as represented in FIG. 4 via the search result collection 444.

A crawler or the like may be used to get the corresponding web pages and any full news as represented in FIG. 5 via step 504. These web pages and news may be in the HTML or XML format, and thus an HTML parser or XML parser may be used to get corresponding pure text documents 448, and as also represented in FIG. 5 via step 504. Note that in FIG. 4, the crawler and/or parser (or parsers) are represented via the page content fetching a parsing module 446.

Because different persons may have the same names, a disambiguation module 450 may be used to differentiate different persons from this set of text documents 448, e.g., by clustering person-related documents for person disambiguation as represented in FIG. 5 via step 508, e.g., as described above with reference to FIGS. 2 and 3. After this process, only the text document or documents for the same person is passed to the step 510.

At step 510, after identifying the related text documents for a single person, an attempt is made to identify the context of this person's name in these documents. For example, the context may be identified by the preceding and/or the succeeding twenty words relative to the target person name. Various name entity identification mechanisms, represented in FIG. 4 via the blocks 452-455, may be applied to the contexts to get related persons, related locations, affiliations and/or related keywords, respectively, for the target person.

Based on the related name entities and related keywords, a relational classification mechanism 458 may be used to obtain a corresponding industry. In general, this relational classification mechanism 458 not only attempts to maximize the probability of the keywords, but also attempts to maximize the consistency of the classification result among related name entities. Step 512 represents this relational classification operation.

Exemplary Operating Environment

Figure 6:
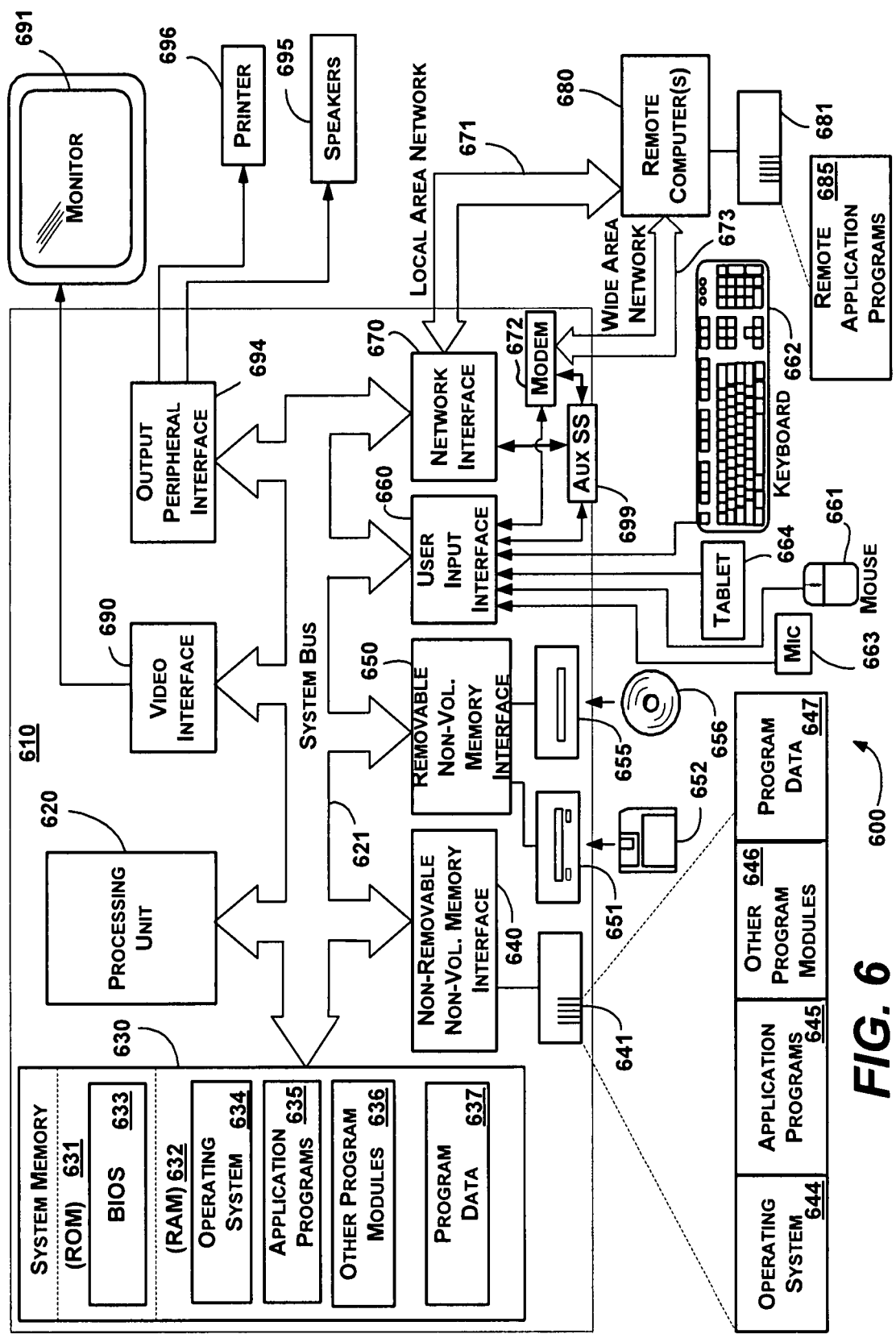
FIG. 6 is a block diagram representing an example computing environment into which example components may be implemented.

FIG. 6 illustrates an example of a suitable computing system environment 600 on which the disambiguation mechanism 110 (FIG. 1) and/or industry classification components (FIG. 4) may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently-being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface (e.g., adapter) 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprised of steps that are each performed by one or more computers, the steps manipulating data and information stored by the one or more computers, the steps of the method comprising:

disambiguating person data located from one or more sets of search results, including extracting information about a person based on name entity extraction, and calculating similarity data, wherein the calculating similarity data comprises using a vector space model, wherein using the vector space model comprises determining a vector for a person, the vector comprising a plurality of entity features including one or more entity locations related to the person, one or more entity organizations related to the person, and one or more entities that the person has been associated with the person, wherein calculating similarity data comprises using a calculation in which each entity feature of the person vector has an entity weight and a nearness weight, and wherein the calculation comprises, for each entity feature, combining the corresponding entity weight and nearness weight with an entity weight and nearness weight of a same entity feature of another person vector and aggregating the combined weights of the entity features.

2. The method of claim 1 wherein extracting the information about a person comprises locating at least one word that is within a word distance in the search results.

3. The method of claim 1 wherein the using the vector space model further comprises using at least one data item of a set of data items, the set including location information, organization information, career information, or partner information.

4. The method of claim 3 wherein at least one data item of the set has a different weight from at least one other data item in the set.

5. The method of claim 1 further comprising clustering person vectors that are similar into clusters, based on the similarity data.

6. The method of claim 5 wherein clustering the person vectors comprises performing an initial cluster merging operation to obtain high quality clusters, and merging clusters that share common data.

7. The method of claim 6 wherein merging clusters comprises selecting a cluster, and determining data that appear more in one cluster and less in other clusters for the selected cluster.

8. The method of claim 7 wherein determining the data comprises using a calculation based on a term and a number of clusters in which the term appears, in which TF and tf represent term frequency, ICF represents inverted cluster frequency, and cf represents cluster frequency:

$$TFICF = tf(\text{term}) \cdot \log \frac{|\text{Cluster}|}{cf(\text{term})}.$$

9. The method of claim 1 further comprising, determining an industry for a person based on the person data.

10. The method of claim 9 wherein determining the industry comprises using at least one mechanism of a set of mechanisms, the set including person name detection, location name identification, affiliation detection, and keyword extraction.

11. The method of claim 10 wherein determining the industry comprises using a relational classification mechanism to output the industry.

12. A computer-readable medium having computer executable instructions, which when executed perform steps, comprising:

disambiguating person data located from one or more text snippets, including:

receiving the text snippets from a search engine in response to a query comprising a person name, the snippets including the person name;

for each snippet extracting therefrom entity names of entities related to the person name, computing weights of the names of the entities according to their respective text distances in the snippet from the person name in the snippet, and constructing a person feature vector comprised of features that correspond to the names of the entities and each feature having the computed weight of its corresponding entity name;

calculating similarity measures between the person feature vectors, each similarity measure representing similarity between two different person feature vectors, where for a given first person feature vector and a given second person feature vector, weights of features of the first person feature vector are combined with weights of the same features from the second person feature vector to compute the similarity measure between the first and second person feature vectors; and clustering the person feature vectors into clusters of similar feature vectors based on the similarity measures.

13. The computer-readable medium of claim 12 wherein extracting the information comprises locating terms within a word distance in the snippets, wherein the terms correspond to at least one data item of a set of data items, the set including location information, organization information, career information, or partner information.

14. The computer-readable medium of claim 13 wherein at least one data item of the set has a different weight from at least one other data item in the set, and wherein the weight is based on nearness to the person's name or on a type of data item, or both on nearness and the type of data item.

15. A computer-readable medium according to claim 12, wherein the disambiguating is performed by a web browser.

16. The computer-readable media of claim 15 wherein the names of entities comprise names of locations, names of organizations, or partner information.

17. A method of disambiguating names performed by one or more computers, the method comprising the following steps performed by the one or more computers:

receiving from a search engine text snippets, the text snippets have been found by the search engine in response to a query comprising a person name, the snippets including the person name;

storing, by the one or more computers, the received text snippets;

for each stored snippet, finding therein the person name and names of entities that are related to a person having the person name, computing weights of the names of the entities according to their respective text distances in the snippet from the person name in the snippet, and constructing a person feature vector comprised of features that correspond to the names of the entities and each feature having the computed weight of its corresponding entity name;

calculating, by processing of the one or more computers, similarity measures between the person feature vectors, each similarity measure representing similarity between two different person feature vectors, where for a given first person feature vector and a given second person feature vector, weights of features of the first person feature vector are combined with weights of the same features from the second person feature vector to compute the similarity measure between the first and second person feature vectors;

executing, by the one or more computers, a clustering algorithm to form clusters of the person feature vectors based on the similarity measures;

merging clusters based on their having in-common same names of entities, each merged duster representing the same person name; and disambiguating the person name by treating each cluster as representing a different person having the same person name.

* * * * *

UNITED STATES PATENT AND TRADEMARK OFFICE
CERTIFICATE OF CORRECTION

PATENT NO. : 7,685,201 B2
APPLICATION NO. : 11/796818
DATED : March 23, 2010
INVENTOR(S) : Hua-Jun Zeng et al.

Page 1 of 1

It is certified that error appears in the above-identified patent and that said Letters Patent is hereby corrected as shown below:

In column 4, line 25, delete "onetime" and insert -- one-time --, therefor.

In column 10, line 31, in Claim 8, delete "
$$TFICF = tf(term) \cdot \log \frac{|Cluster|}{cf(term)} \cdot$$
" and insert --
$$TFICF = tf(term) \cdot \log \frac{|Clusters|}{cf(term)} \cdot$$
 --, therefor.

In column 12, line 3, in Claim 17, delete "ofthe" and insert -- of the --, therefor.

In column 12, line 25, in Claim 17, delete "duster" and insert -- cluster --, therefor.

Signed and Sealed this
Nineteenth Day of July, 2011

David J. Kappos
*Director of the United States Patent and Trademark Office*